US009128308B1

(12) United States Patent
Zortman et al.

(10) Patent No.: US 9,128,308 B1
(45) Date of Patent: Sep. 8, 2015

(54) LOW-VOLTAGE DIFFERENTIALLY-SIGNALED MODULATORS

(71) Applicant: Sandia Corporation, Albuquerque, NM (US)

(72) Inventors: William A. Zortman, Corrales, NM (US); Anthony L. Lentine, Albuquerque, NM (US); Alexander H. Hsia, Albuquerque, NM (US); Michael R. Watts, Hingham, MA (US)

(73) Assignee: Sandia Corporation, Albuquerque, NM (US)

( * ) Notice: Subject to any disclaimer, the term of this patent is extended or adjusted under 35 U.S.C. 154(b) by 276 days.

(21) Appl. No.: 13/770,501

(22) Filed: Feb. 19, 2013

Related U.S. Application Data

(60) Provisional application No. 61/615,721, filed on Mar. 26, 2012.

(51) Int. Cl.
*G02F 1/035* (2006.01)
*G02F 1/025* (2006.01)

(52) U.S. Cl.
CPC ................................. *G02F 1/025* (2013.01)

(58) Field of Classification Search
None
See application file for complete search history.

(56) References Cited

U.S. PATENT DOCUMENTS

| | | | |
|---|---|---|---|
| 4,525,687 A | 6/1985 | Chemia et al. | |
| 6,192,167 B1 | 2/2001 | Kissa et al. | |
| 7,010,179 B2 | 3/2006 | Hatta et al. | |
| 7,239,762 B2 | 7/2007 | Kimerling et al. | |
| 2004/0202397 A1* | 10/2004 | Hatta et al. | 385/2 |
| 2012/0243828 A1* | 9/2012 | Suzuki | 385/32 |
| 2013/0209023 A1* | 8/2013 | Prosyk | 385/3 |
| 2014/0050436 A1* | 2/2014 | Lee et al. | 385/2 |

OTHER PUBLICATIONS

Berg et al., "High Speed Ultra Low Voltage CMOS Inverter", IEEE Computer Society Annual Symposium on VSLI, 2008, pp. 22-127.

Ding et al., "Ultra-low-power carrier-depletion Mach-Zehnder silicon optical modulator", Optics Express, 20(7): Mar. 26, 2012, pp. 7081-7087.

Dong et al., "High-speed and compact silicon modulator based on a racetrack resonator with a 1 V drive voltage," Optics Letters, 35(19): Oct. 1, 2010, pp. 3246-3248.

Dong et al., "Lov Vpp, ultralow-energy, compact, high speed silicon electro-optic modulator", Optics Express, 17(25); Dec. 7, 2009, pp. 2284-22490.

Feng et al., "30Ghz Ge electro-absorption modulator integrated with 3μm silicon-on-insulator waveguide", Optics Express, 19(8): Apr. 11, 2011, pp. 7062-7067.

Goosen et al., "Self-Biased SEED Using Highly Electroabsorbtive Slightly Asymmetric Coupled Quantum Wells", Lasers and Electro-Optics Society Annual Meeting, 1990, Conference Proceedings, IEEE, pp. 310-311.

(Continued)

*Primary Examiner* — Sung Pak
(74) *Attorney, Agent, or Firm* — Martin I. Finston

(57) ABSTRACT

Photonic modulators and methods of modulating an input optical signal are provided. A photonic modulator includes at least one modulator section and differential drive circuitry. The at least one modulator section includes a P-type layer and an N-type layer forming a PN junction in the modulator section. The differential drive circuitry is electrically coupled to the P-type layer and the N-type layer of the at least one modulator section.

19 Claims, 12 Drawing Sheets

(56) References Cited

OTHER PUBLICATIONS

Intel quick path Architecture http://www.intel.com/technology/quickpath/introduction.pdf (2009), 22 pgs.

Kim et al., "A 4Gb/S/ch 356fJ/b 10 m m equalized on-chip interconnect with nonlinear charge-injecting transmit filter and transimpedance receiver in 90nm CMOS" Solid-State Circuits Conference—Digest of Technical Papers, 2009, IEEE International, 66-67, 67a.

Kogge et al., "ExaScale Computing Study: Technology Challenges in Achieving ExaScale Systems", Univ. of Notre Dame, CSE Dept. Tec. Report TR-2008-13 (2008).

Krishnamoorthy et al., "Computer Systems Based on Silicon Photoic Interconnects", Proceedings of the IEEE 97(7): Jul. 2009, pp. 1337-1361.

Kuo et al., "Strong quantum-confined Start effect in germanium quantum-well structures on silicon", Nature Letters, vol. 437, Oct. 27, 2005, pp. 1334-1336.

Le, J.L. et al., "Plasmon-based photosensors comprising a very thing semiconducting region", App. Phys. Let. 94, 2009; pp. 1881104-1 thru 1181104-3.

Li et al., "25Gb/s 1V-driving CMOS ring modulator with integrated thermal tuning", Optics Express, 19(21): Oct. 10, 2011, pp. 20435-20443.

Manipatruni et al., "High Speed Carrier Injection 18 Gb/s silicon Micro-ring Electro-optic Modulator", Proceedings of LEOS (2007), pp. 537-538.

Manipatruni et al., "Ultra-low voltage, ultra-small mode volume silicon microring modulator", Optics Express 18(17): Aug. 16, 2010, pp. 18235-18242.

Reed et al., "Recent developments in silicon optical modulators", Integrated Photonics research, Silicon and Nanophotonics, OSA Technical Digest (CD) Optical Society of America, 2010.

Seo et al., "High-Bandwidth and Low-Energy On-Chip Signaling With Adaptive Pre-Emphasis in 90nm CMOS" Solid-State Circuits Conference Digest of Technical Papers, 2010 IEEE International, pp. 182-183.

Watts et al., "Low-Voltage, Compact, Depletion-Mode, Silicon Mach-Zehnder Modulator", IEEE Journal of Selected Topics in Quantum Electronics, 16(1): Jan./Feb. 2010, pp. 159-164.

Watts et al., "Ultralow Power Silicon Microdisk Modulators and Switches", Group IV Photonics, 5$^{th}$ IEEE International Conference, 2008, pp. 4-6.

Watts et al., "Vertical junction silicon microdisk modulators and switches", Optics Express, 19(22): Oct. 24, 2011, pp. 21989-22003.

Xu et al., "Micrometre-scale silicon electro-optic modulator", Nature Letters, vol. 435, May 2005, pp. 325-327.

Zortman et al., "Low-Power High-Speed Silicon Microdisk Modulators", Lasers and Electro-Optics (CLEO) and Quantum Electronics and Laser Science Conference, May 2010, 2 pgs.

* cited by examiner

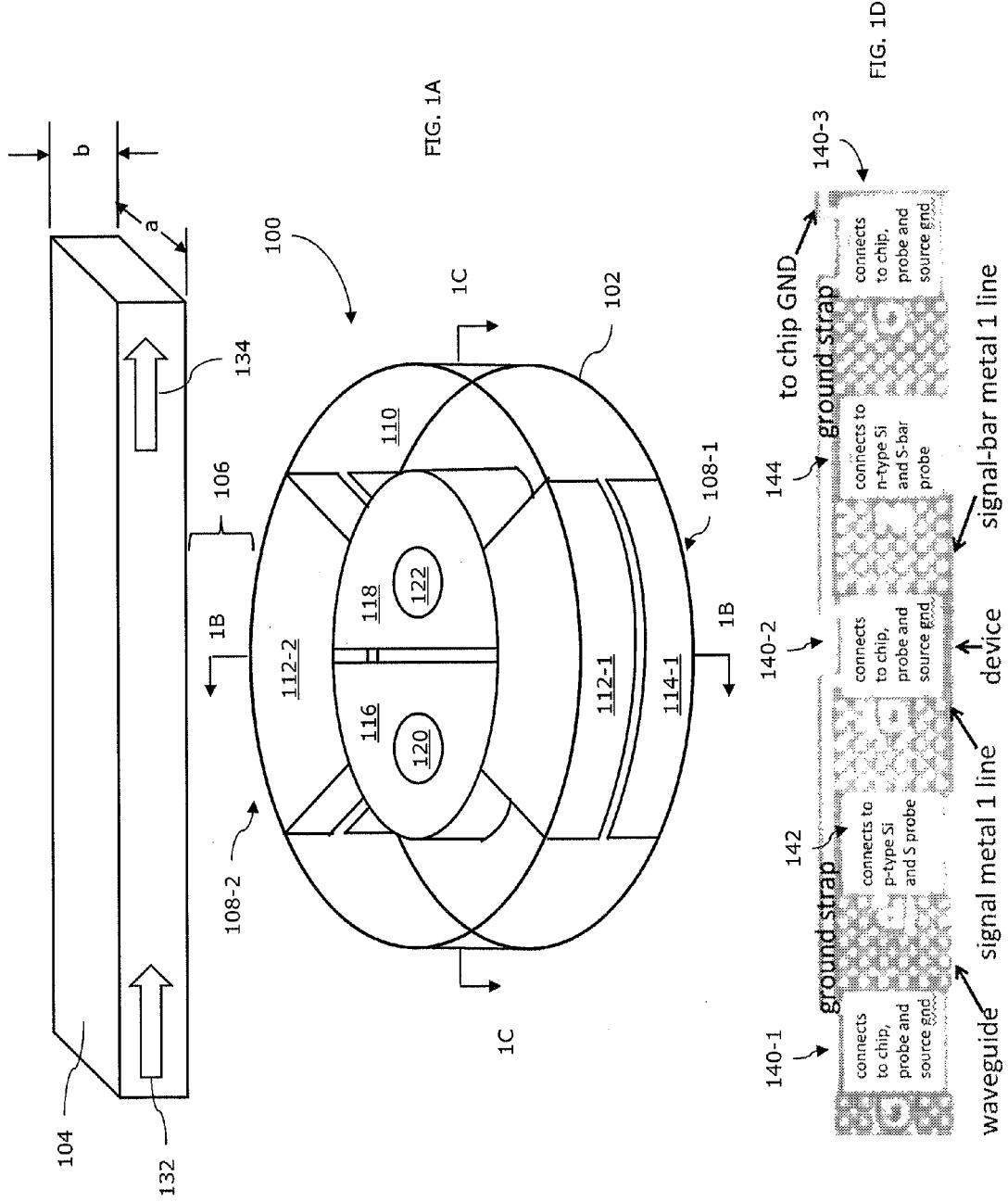

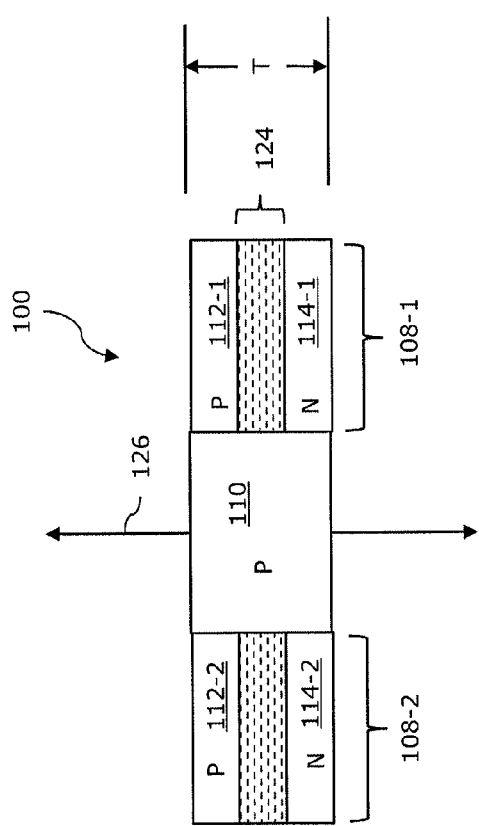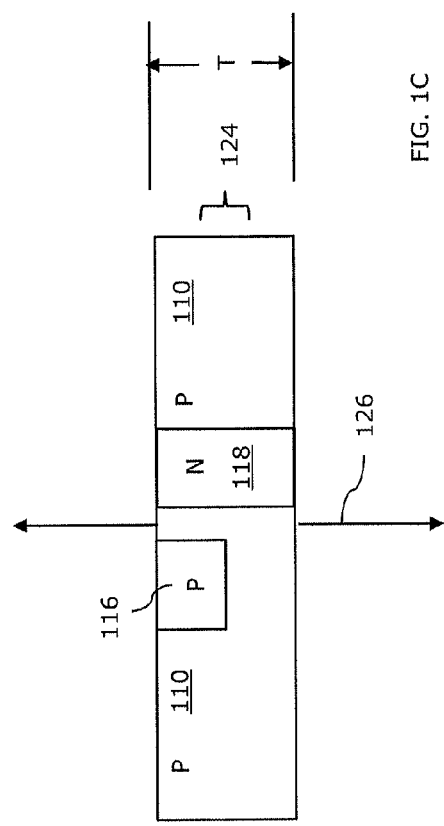

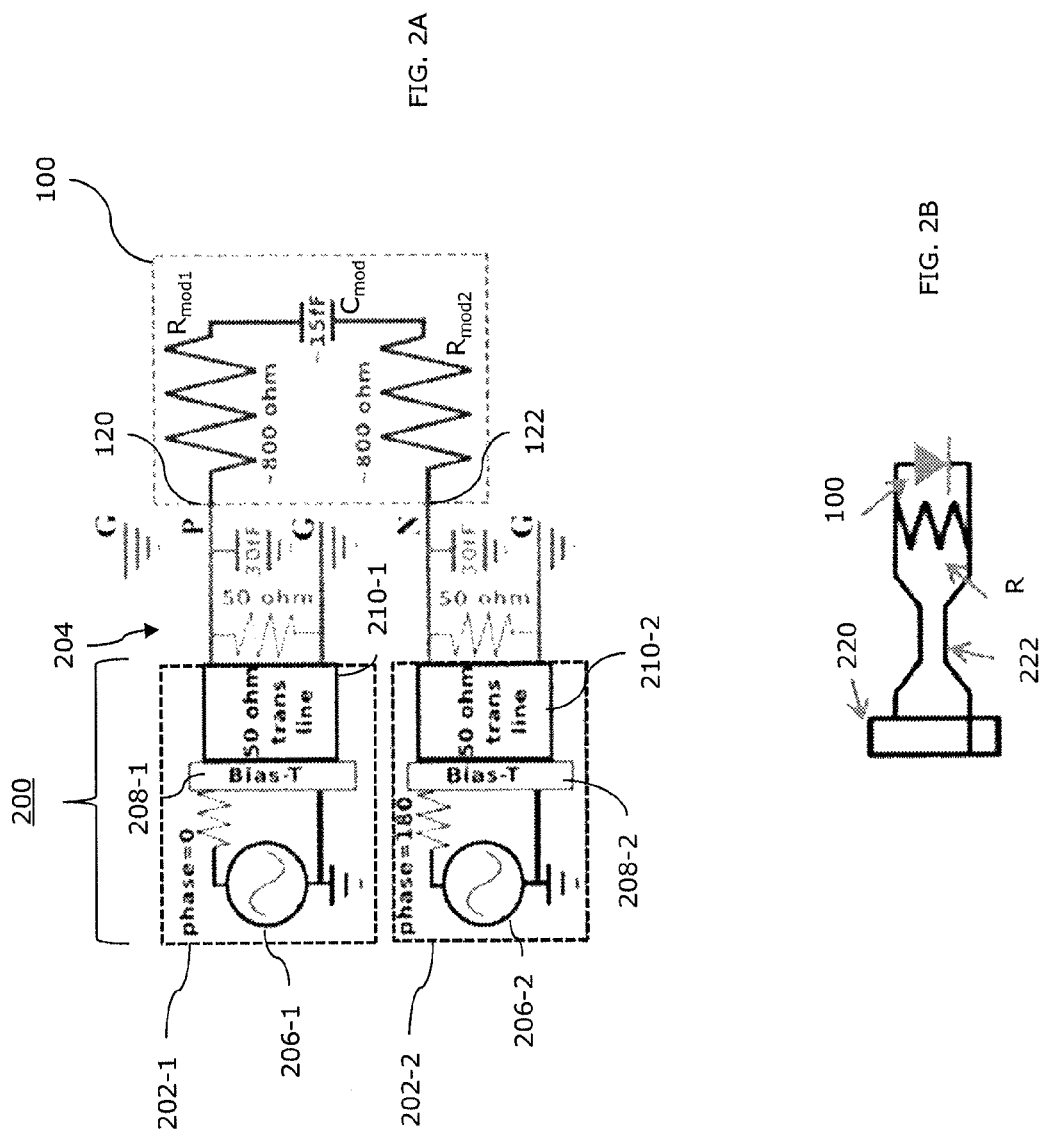

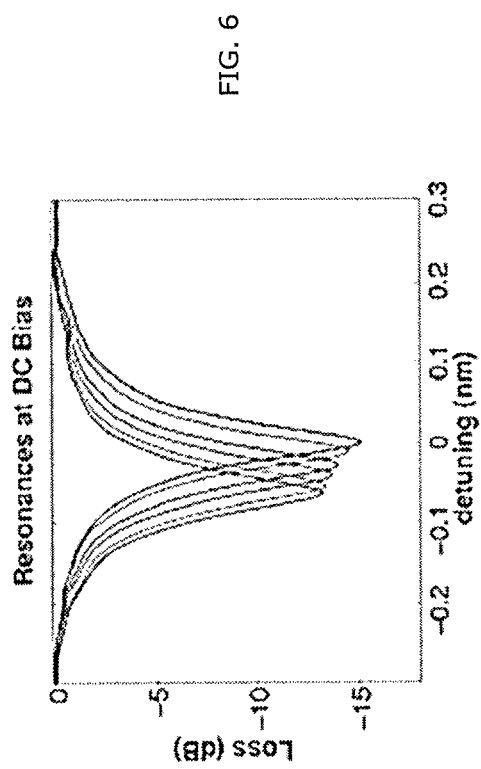
FIG. 6
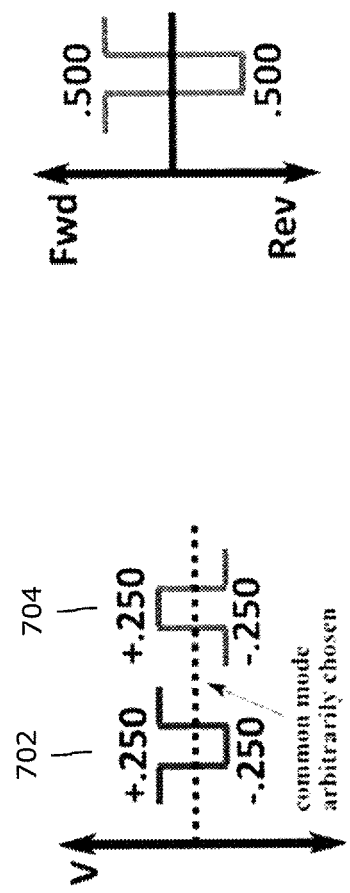
FIG. 7B
FIG. 7A

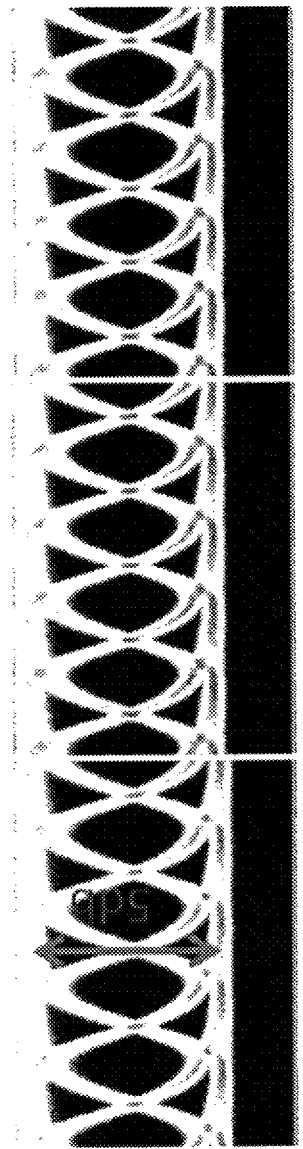
FIG. 8A
FIG. 8B
FIG. 8C
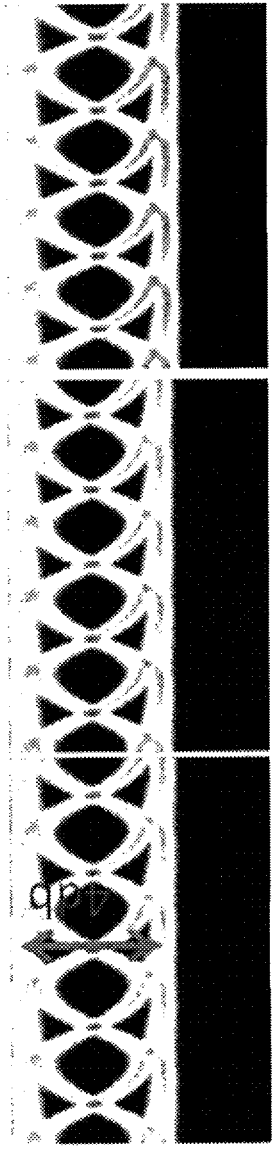
FIG. 8D
FIG. 8E
FIG. 8F

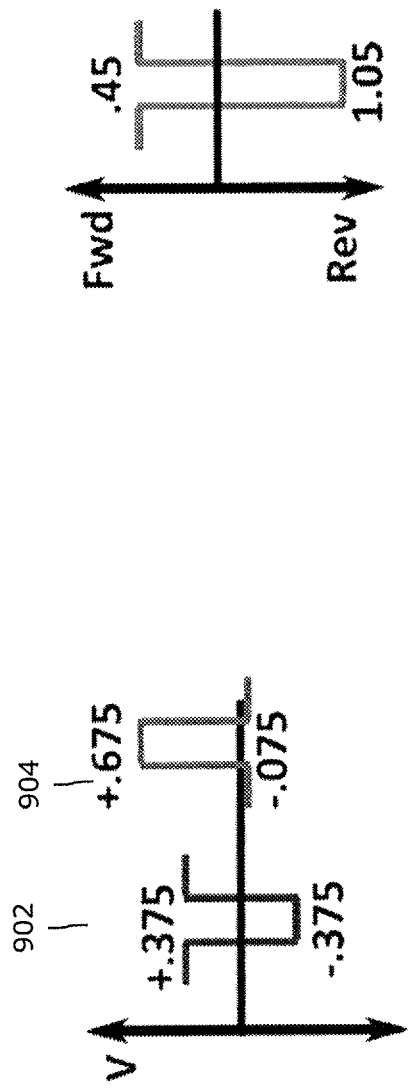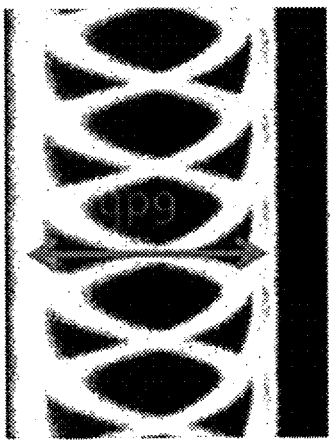
FIG. 9B
FIG. 9C
FIG. 9A

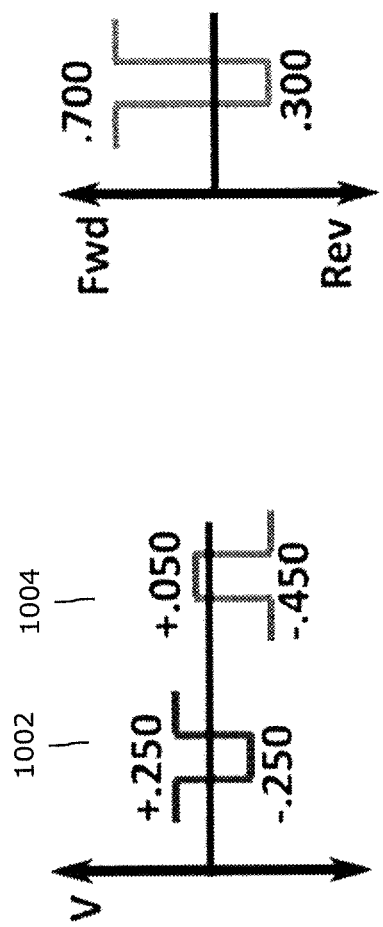
FIG. 10A
FIG. 10B
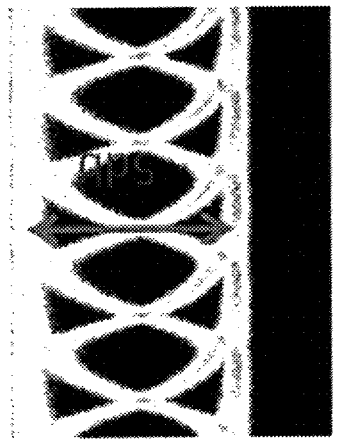
FIG. 10C

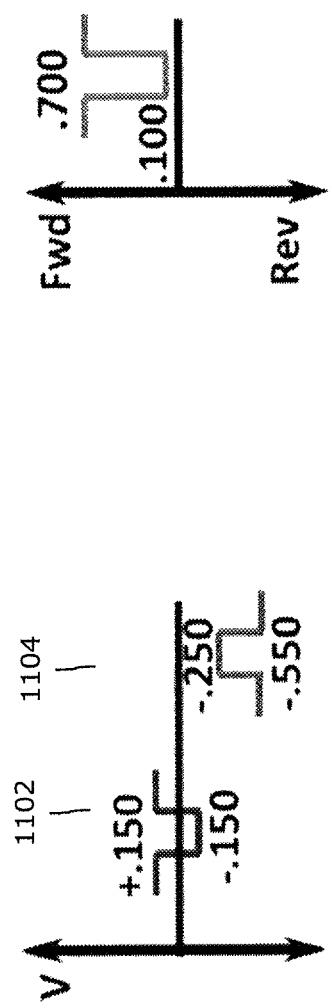
FIG. 11A
FIG. 11B
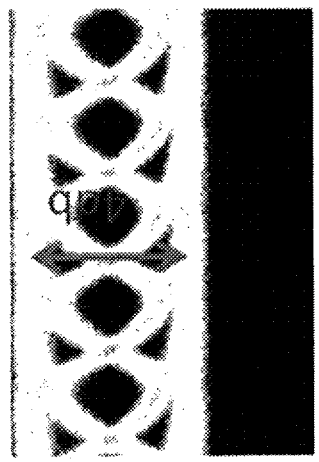
FIG. 11C

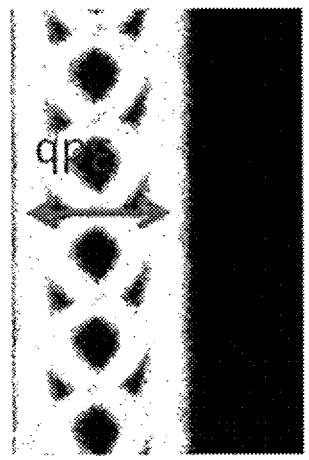
FIG. 12B
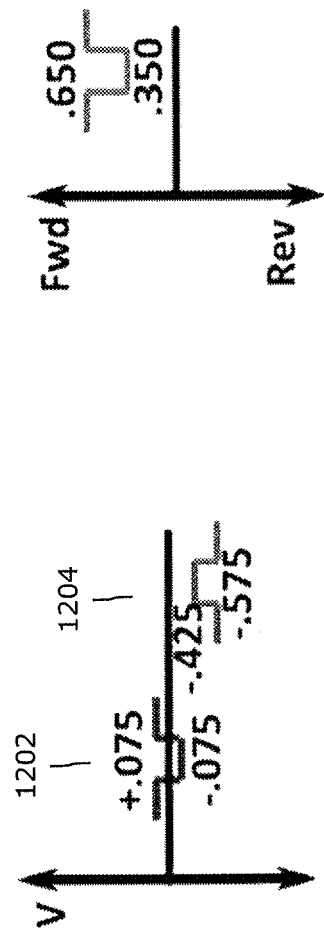
FIG. 12A
FIG. 12C

LOW-VOLTAGE DIFFERENTIALLY-SIGNALED MODULATORS

CROSS REFERENCE TO RELATED APPLICATIONS

This application is related to and claims the benefit of U.S. Provisional Application No. 61/615,721 entitled LOW-VOLTAGE DIFFERENTIALLY SIGNALED MODULATORS flied on Mar. 26, 2012, the contents of which are incorporated herein by reference.

STATEMENT REGARDING FEDERALLY SPONSORED RESEARCH

This invention was developed under Contract DE-AC04-94AL85000 between Sandia Corporation and the U.S. Department of Energy. The U.S. Government has certain rights in this invention.

FIELD OF THE INVENTION

The present invention is directed generally to low-voltage differentially-signaled modulators, and, more particularly, to low-voltage differentially-signaled resonator modulators and low-voltage differentially-signaled Mach-Zehnder modulators.

BACKGROUND OF THE INVENTION

Recent demonstrations of ring and disk silicon micro-resonators continue to build the case for these devices as compact, low power and high-speed solutions for chip-to-chip optical interconnects. These efforts have demonstrated very low power consumption (and energy-per-bit) as well as single volt drive, which makes these devices compatible with current complementary metal oxide semiconductor (CMOS) drive voltages. Even lower drive voltages have been proposed for devices operating in forward bias (although they pull a direct current).

An advantage of low drive voltage is that while the International Technology Roadmap for Semiconductors (ITRS) predicts transistor supply voltage ($V_{dd}$) levels to drop below 710 my in 2019, recent work has suggested that in order to reduce power in exascale supercomputers to reasonable levels, transistor supply voltages may need to be lower than ITRS predictions. Chip supply rail levels of 500 mV are a possibility, and demonstrations have shown logic gates that can be run with $V_{dd}$ as low as 350 mV. In order for optics to function with the low drive voltages proposed and the lower power demanded by exascale data centers and high performance computing (HPC) applications, both low voltage and low power are desired. It is possible to obtain low voltage and low power in reverse biased photonic devices.

For exascale computing applications, viable optical solutions are desired to operate using low voltage signaling and with low power consumption.

SUMMARY OF THE INVENTION

The present invention is embodied in a photonic modulator. The photonic modulator includes at least one modulator section and differential drive circuitry. The at least one modulator section includes a P-type layer and an N-type layer forming a PN junction in the modulator section. The differential drive circuitry is electrically coupled to the P-type layer and the N-type layer of the at least one modulator section.

The present invention is also embodied in a differential Mach-Zehnder modulator (MZM). The differential MZM includes a Mach-Zehnder interferometer and differential drive circuitry. The Mach-Zehnder interferometer includes an input optical coupler, two waveguide arms optically coupled to the input optical coupler and an output optical coupler optically coupled to the two waveguide arms. Each waveguide arm includes a modulator section. Each modulator section includes a P-type layer and an N-type layer forming a PN junction in the modulator section The differential drive circuitry is electrically coupled to the modulator section of each of the two waveguide arms of the Mach-Zehnder interferometer. The differential drive circuitry is configured to differentially drive the P-type layer and the N-type layer of each modulator section and to differentially drive the two waveguide arms.

The present invention is further embodied in a method of modulating an input optical signal. The method includes coupling the input optical signal to at least one modulator section, where the at least one modulator section includes a P-type layer and an N-type layer forming a PN junction in the modulator section. The method also includes applying differential signaling to the at least one modulator section via differential drive circuitry electrically coupled to the P-type layer and the N-type layer of the at least one modulator section, to modulate the input optical signal by the at least one modulator section and to form an output optical signal; and transmitting the output optical signal.

The present invention is further embodied in a method of modulating an input optical signal. The method includes providing the input optical signal to two waveguide arms of a Mach-Zehnder interferometer via an input optical coupler, where each waveguide arm includes a modulator section and each modulator section includes a P-type layer and an N-type layer forming a PN junction in the modulator section. The method also includes applying differential signaling to the Mach-Zehnder interferometer to differentially drive the P-type layer and the N-type layer of each modulator section while differentially driving the two waveguide arms via differential drive circuitry electrically coupled to the modulator section of each waveguide arm, to modulate the input optical signal by each modulator portion and to form two modulated signals; mixing the two modulated signals from the two waveguide arms via an output optical coupler to form an output optical signal; and transmitting the output optical signal.

It is to be understood that both the foregoing general description and the following detailed description are exemplary, but are not restrictive, of the invention.

BRIEF DESCRIPTION OF THE DRAWINGS

The invention may be understood from the following detailed description when read in connection with the accompanying drawing. It is emphasized, according to common practice, that various features of the drawing may not be drawn to scale. On the contrary, the dimensions of the various features may be arbitrarily expanded or reduced for clarity. Moreover, in the drawing, common numerical references are used to represent like features. Included in the drawing are the following figures:

FIG. 1A is a perspective view diagram of an exemplary photonic modulator, according to an embodiment of the present invention;

FIG. 1B is a cross-sectional view diagram of the photonic modulator shown in FIG. 1A along line 1B-1B, according to an embodiment of the present invention;

FIG. 1C is a cross-sectional view diagram of the photonic modulator shown in FIG. 1A along line 1C-1C, according to an embodiment of the present invention;

FIG. 1D is a marked-up photograph of an exemplary contact pad structure for the photonic modulator shown in FIG. 1A, according to an embodiment of the present invention;

FIG. 2A is a circuit diagram of the photonic modulator shown in FIG. 1A configured for differential signaling, according to an embodiment of the present invention;

FIG. 2B is a circuit diagram of the photonic modulator shown in FIG. 1A configured for low voltage signaling (LVS), according to an embodiment of the present invention;

FIG. 6 is an example graph of resonances as a function of wavelength detuning for various applied voltages for the photonic modulator shown in FIG. 1A, according to an embodiment of the present invention;

FIGS. 7A and 7B are example graphs of input differential signals relative to a common mode voltage and an output differential signal with respect to bias point for an example symmetric drive condition using the photonic modulator shown in FIG. 1A, according to an embodiment of the present invention;

FIGS. 8A, 8B, 8C, 8D, 8E and 8F are example eye diagrams for the photonic modulator shown in FIG. 1A for various symmetric drive conditions, according to embodiments of the present invention;

FIGS. 9A and 9B are example graphs of input differential signals illustrating asymmetric common mode voltages and an output differential signal with respect to bias point for an example asymmetric drive condition using the photonic modulator shown in FIG. 1A, according to an embodiment of the present invention;

FIG. 9C is an example eye diagram for the photonic modulator shown in FIG. 1A for the example asymmetric drive condition shown in FIGS. 9A and 9B, according to an embodiment of the present invention;

FIGS. 10A and 10B are example graphs of input differential signals illustrating asymmetric common mode voltages and an output differential signal with respect to bias point for another example asymmetric drive condition using the photonic modulator shown in FIG. 1A, according to an embodiment of the present invention;

FIG. 10C is an example eye diagram for the photonic modulator shown in FIG. 1A for the example asymmetric drive condition shown in FIGS. 10A and 10B, according to an embodiment of the present invention;

FIGS. 11A and 11B are example graphs of input differential signals illustrating asymmetric common mode voltages and an output differential signal with respect to bias point for another example asymmetric drive condition using the photonic modulator shown in FIG. 1A, according to an embodiment of the present invention;

FIG. 11C is an example eye diagram for the photonic modulator shown in FIG. 1A for the example asymmetric drive condition shown in FIGS. 11A and 11B, according to an embodiment of the present invention;

FIGS. 12A and 12B are example graphs of input differential signals illustrating asymmetric common mode voltages and an output differential signal with respect to bias point for another example asymmetric drive condition using the photonic modulator shown in FIG. 1A, according to an embodiment of the present invention; and FIG. 12C is an example eye diagram for the photonic modulator shown in FIG. 1A for the example asymmetric drive condition shown in FIGS. 12A and 12B, according to an embodiment of the present invention.

DETAILED DESCRIPTION OF THE INVENTION

Figure 3:
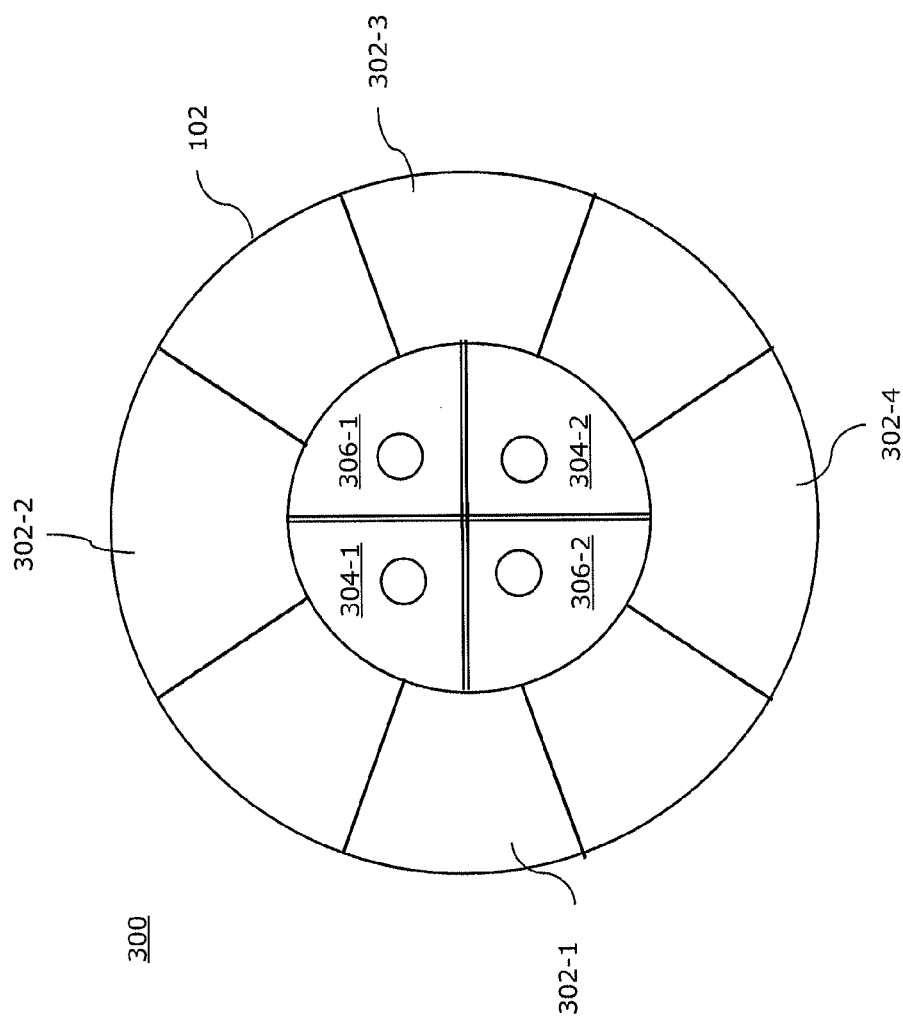
FIG. 3 is an overhead view diagram of an exemplary photonic modulator, according to another embodiment of the present invention.

As discussed above, photonic devices (such as ring and disk silicon micro-resonators) may be compatible with CMOS drive voltages and may be designed for low power consumption. Additionally, future chip designs may have low voltage signaling (LVS) on chip or rely on LVS for off chip signaling. LVS here refers to the general application of low voltage lines (typically between about 25 mV to about 5 V) operating using a differential pair which includes many standards such as current mode logic (CML), voltage mode logic (VML) and low voltage differential signaling (LVDS). LVDS levels have declined with CMOS supplies for several years in compliance with Joint Electron Devices Engineering Council (JEDEC) guidance.

Differentially signaled lines for memory access have already replaced the traditional front side bus on contemporary processors. Recent research into on chip LVDS technology has demonstrated 5 Gbps with less than 400 mV signal amplitude. In addition, differentially signaled lines terminate with less than 100 mV of amplitude, meaning that a photonic device taking this signal beyond the chip may have to operate with voltages at this level. Signal conditioning in the electronics may not be eliminated and terminating with optics may not always be convenient. LVS on chip is evolving to take a greater role for intra-chip interconnections and optics, providing inter-chip interconnections should be able to operate at these low voltages.

Different signaling regimes have been proposed for silicon photonic resonant modulators. These signaling regimes include forward bias, reverse bias and alternating current (AC) coupling.

For forward bias signaling, modulators are driven with a forward biased PN junction and use a high current driver coupled to the modulator. Forward biased devices may, for example, operate at about 274 fJ/bit with $V_{dd}$ of about 0.96 V. For reverse bias signaling, modulators are driven with a reverse biased PN junction and use a high voltage driver coupled to the modulator. Reverse biased devices may, for example, operate at about 50 fJ/bit with $V_{dd}$ of about 2 V. For AC coupling signaling, the modulator may take advantage of both forward and reverse bias operation. The resulting AC coupled modulator is typically very low power, but the circuit implementation may be more complex. Either a transistor or diode (or some element) is typically placed between the modulator or inverter and ground to maintain a desired bias point. AC coupled devices may, for example, operate at about 3 fJ/bit with $V_{dd}$ of about 1 V.

In the development of silicon photonics, power, or energy/bit, and voltage have both received due attention. Yet the improvements in power, while helped by design evolution, have mostly been the result of the reduced voltages for signaling. These are generally the result of improved signaling methods.

All of the above-described regimes, except AC coupling, have relatively straightforward implementation in CMOS. AC coupling suffers from the need to integrate a capacitor and to maintain a constant voltage offset from ground using a circuit element to compensate for the inverter transfer function current swing. Furthermore, AC coupled transmitters typically use encoding preventing them from going to an undefined state during idle. Forward bias and reverse bias circuits may be easily implemented, but use high voltage or high current drivers, which may increase the direct current (DC) or AC power requirements of the transmitter.

Aspects of the present invention relate to photonic modulators and methods of producing a modulated optical signal. An exemplary photonic modulator may include at least one modulator section and differential drive circuitry. Each modulator section may include a P-type layer and an N-type layer forming a PN junction in the modulator section. The differential drive circuitry may be electrically coupled to the P-type layer and the N-type layer of each modulator section. Each modulator section may include an electro-refraction modulator or an electro-absorption modulator.

An exemplary photonic modulator of the present invention may include a micro-resonator having a at least one modulator section and differential drive circuitry. Each modulator section may include a P-type layer and an N-type layer arranged such that a PN junction is formed in the modulator section. The micro-resonator may include a P-type contact electrically coupled to the P-type layer of each modulator section and an N-type contact electrically coupled to the N-type layer of each modulator section. The differential drive circuitry may be electrically coupled to the P-type contact and the N-type contact. Thus, the P-type and N-type layers may be driven by a driver with two differential outputs, where one differential output may be connected to each P-type layer and the remaining differential output may be connected to each N-type layer. According to exemplary embodiments, the differential drive circuitry may be operated under symmetric drive or asymmetric drive conditions.

According to an embodiment of the present invention, differential signaling may be implemented with inverters and with no special drivers. Thus, the exemplary differential signaling may be easily integrated into existing signaling regimes.

According to aspects of the present invention, differential signaling may be implemented with a complementary circuit that may add power consumption equal to a second inverter and signal line. The added power consumption may be offset by the capability of using a lower driving voltage. Furthermore, on chip implementations of LVS, should they exist, may be directly terminated into these devices as is. This may eliminate receiver circuit implementation and may allow for easy conversion of LVS transmitted data to the optical domain for longer distance transmission. In contrast to exemplary differential signaling designs of the present invention, conventional forward bias, reverse bias and AC coupled designs do not have straightforward LVS implementations.

Because LVS signals may be attenuated, operation of an exemplary photonic modulator well below ITRS predictions may be possible. It may be appreciated that any implementation of LVS circuits is typically not simplified by termination in a photonic device. However, exemplary photonic modulators with differential signaling may provide the easiest integration compared to conventional signaling schemes thus far demonstrated in silicon photonic resonant modulators. According to exemplary embodiments of the present invention, differential signaling of a photonic modulator may be implemented by LVDS termination or by two differentially driven inverters operating at predicted $V_{dd}$ levels.

Disclosed herein is an exemplary photonic modulator with differential signaling. According to an exemplary embodiment, when a photonic modulator is symmetrically driven, the photonic modulator may operate at about 3 fJ/bit, about 10 Gbps and about 500 mV amplitude with about 5 dB extinction, or about 400 mV with about 4 dB extinction with a wide range of common mode voltages on the differential inputs. With asymmetric drive it is possible to drive the photonic modulator with about 150 mV to realize an extinction ratio of about 3 dB and energy consumption of less than about 1 fJ/bit at 10 Gbps. For each demonstration the bit error rate (BER) is less than about $10^{-12}$ using a $2^{31}-1$ psuedorandom bit sequence (PRBS). Exemplary differentially signaled modulators may simplify and expand the design space for modulator implementation and do not require any special drivers.

Additional aspects of the present invention relate to differential Mach-Zehnder modulators (MZM) and methods of producing a modulated optical signal. An exemplary photonic modulator includes a Mach-Zehnder interferometer and differential drive circuitry. The Mach-Zehnder interferometer may include an input coupler, an output coupler and two waveguide arms optically coupled to the input and output couplers. Each waveguide arm may include a modulator section, where each modulator section may include a P-type layer and an N-type layer forming a PN junction in the modulator section. The differential drive circuitry may be coupled to the modulator section of each of the waveguide arms. According to an exemplary embodiment, differential signaling may be applied to both waveguide arms of the Mach-Zehnder interferometer. The electrical signal on one line on each waveguide arm of the Mach-Zehnder interferometer may be delayed by π radians. The differential drive circuitry may be configured to drive the P-type layer and the N-type layer of each modulator section while differentially driving the two waveguide arms. Exemplary differential signaling of the present invention may produce about double a reduction in voltage compared to conventional differential MZMs and about a four-times reduction in voltage when compared to conventional non-differential MZMs.

Referring to FIGS. 1A-1D, an exemplary photonic modulator 100 is shown. In particular, FIG. 1A is a perspective view diagram of photonic modulator 100; FIG. 1B is a cross-sectional view diagram photonic modulator 100 along line 1B-1B; FIG. 1C is a cross-sectional view diagram photonic modulator 100 along line 1C-1C; and FIG. 1D is a marked-up photograph of an exemplary contact pad structure for photonic modulator 100. FIG. 1A also illustrates waveguide 104 which may be separated from photonic modulator 100 by gap 106. Photonic modulator 100 may also include differential drive circuitry 200 (shown in FIG. 2A).

Photonic modulator 100 may include micro-resonator 102 having a plurality of modulator sections 108 formed within micro-resonator 102. In an exemplary embodiment, two modulator sections 108-1, 108-2 are illustrated, with each modulator section 108-1, 108-2 extending in an arc of about π/2 radians around central axis 126 (FIG. 1B) of micro-resonator 102. Central axis 126 extends along a thickness direction of micro-resonator 102 (having thickness T). In other words, each modulator section 108 subtends about π/2 radians of a circumference of micro-resonator 102. In FIG. 1A, angular centers of modulator sections 108-1, 108-2 are arranged about π radians apart.

Although FIG. 1A illustrates two modulator sections 108-1, 108-2 each subtending about π/2 radians of the circumference of micro-resonator 102, modulator sections 108 are not limited to this arrangement. For example, photonic modulator 100 may include one modulator section 108 or may include more than two modulator sections 108 (such as described further below with respect to FIG. 3). In general, modulator section 108 may subtend up to about $2\pi$ radians of the circumference of micro-resonator 102. Although FIG. 1A illustrates modulator sections 108-1 and 108-2 being separated by about $\pi/2$ radians, modulator sections 108-1 and 108-2 may be formed with a minimal separation of about 0 radians.

Micro-resonator 102 of photonic modulator 100 may be formed of material 110. In an exemplary embodiment, material 110 includes silicon having a P-type doping concentration of about $10^{14}$ cm$^{-3}$. Micro-resonator 102 may be formed of silicon, or other suitable CMOS compatible semiconductor material. Possible materials of micro-resonator 102 may include II/V and II/VI materials. In general, micro-resonator 102 and waveguide 104 may each be formed of materials including, without being limited to, silicon, silicon nitride, indium phosphide, germanium, silica, fused quartz, sapphire, alumina, glass, gallium arsenide, gallium aluminum arsenide, selenium, silicon carbide, lithium niobate, silicon on insulator, germanium on insulator and silicon germanium. It is understood that the wavelength of the carrier wave (that is modulated) and photonic modulator 100 dimensions may be variable depending on the selected material.

Although not shown, photonic modulator 100 and waveguide 104 may be formed on a substrate. The substrate may include any suitable material including, but not limited to, silicon, indium phosphide, germanium, silica, fused quartz, sapphire, alumina, glass, gallium arsenide, silicon carbide, lithium niobate, silicon on insulator and germanium on insulator.

Although FIG. 1A illustrates micro-resonator 102 formed as a disk resonator, micro-resonator 102 may include any disk micro-resonator or ring micro-resonator capable of optically coupling light to and from waveguide 104. Although FIG. 1A illustrates micro-resonator 102 having a circular symmetry, micro-resonator 102 may include also include, without being limited to, oval and elliptical micro-resonators.

As shown in FIGS. 1A and 1B, each modulator section 108 includes P-type layer 112 and N-type layer 114. A PN junction between P-type layer 112 and N-type layer 114 may be a vertical PN junction (i.e., substantially normal to central axis 126).

As shown in FIGS. 1A and 1C, micro-resonator 102 may also include P-type contact region 116 and N-type contact region 118. Contact regions 116, 118 may be separated by material 110 of micro-resonator 102. FIG. 1A also illustrates the positions of P-type contact region 116 and N-type contact region 118 relative to P-type layer 112, N-type layer 114 and (micro-resonator) material 110.

FIG. 1A illustrates electrical contacts 120, 122 on respective contact regions 116, 118. Electrical contacts 120, 122 may be used to provide drive signals from differential drive circuitry 200 (FIG. 2A) to control modulator sections 108-1, 108-2 (described further below with respect to FIG. 2A).

P-type contact region 116 may be electrically coupled to both P-type layers 112-1 and 112-2. Similarly, N-type contact region 118 may be electrically coupled to both N-type layers 114-1 and 114-2. P-type layers 112-1, 112-2 and N-type layers 114-1, 114-2 may be driven by differential driving circuitry 202 (FIG. 2A), where one differential output may be electrically coupled to P-type layers 112-1, 112-2 (via P-type contact region 116) and the remaining differential output may be electrically coupled to N-type layers 114-1, 114-2 (via N-type contact region 118).

In an exemplary embodiment, P-type layer 112 and N-type layer 118 have opposite doping concentrations of about $10^{18}$ cm$^{-3}$. In an exemplary embodiment, P-type contact region 116 and N-type contact region 118 may have opposite doping concentrations of about $10^{20}$ cm$^{-3}$.

Photonic modulator 100 may be formed of a suitable size so that it may produce a desired modulation. In an exemplary embodiment, micro-resonator 102 may have a diameter of about 3.5 μm and may be formed of a thickness T (FIG. 1B) of about 250 nm silicon on 3 μm of buried oxide, and then over-clad with about 5 μm of deposited oxide. According to the exemplary embodiment, P-type contact region 116 has a thickness of about 100 nm (along central axis 126); N-type contact region 118 is the full thickness T of micro-resonator 102; both contact regions 116, 118 are about 2 μm wide at a maximum width; each of P-type layers 112 and N-type layers 114 have a thickness of about 100 nm (along central axis 126); modulator sections 108 have a width of about 750 nm (normal to central axis 126); waveguide 104 has a width of about 400 nm; and waveguide 104 has a thickness b of about 250 nm. Waveguide 104 may be horizontally optically coupled to photonic modulator with gap 106 between photonic modulator 100 and waveguide 104 being about 350 nm. Each modulator section 108 has a doping concentration of $10^{18}$ cm$^{-3}$. Contact regions 116, 118 are doped to $10^{20}$ cm$^{-3}$ and electrically contacted using tantalum lined tungsten contacts 120, 122. Each modulator section 108-1, 108-2 is built over $\pi$ radians of micro-resonator 102 using a single mask layer with N and P dopants implanted using different energies creating vertical depletion region 124. By limiting the dopants to just $\pi$ radians, the resistive path that charge carriers must travel during extraction and return may be reduced. Thus, the current path may be shorter and a higher modulation speed may be obtained. The dimensions provided above demonstrate one example of photonic modulator 100 of a silicon material configured to receive about 1500 nm light (i.e., input optical signal 132). It is understood that different wavelengths of input optical signal 132 in different materials may result from photonic modulator 100 being formed of different dimensions.

In general, an upper bound diameter of photonic modulator 100 may be selected based on a size of the substrate. A lower bound diameter of photonic modulator 100 may be selected based on the coupled frequency and material of photonic modulator 100. According to an exemplary embodiment, a diameter of photonic modulator 100 may be between about 1 μm to about 300 mm.

FIG. 1D illustrates an example pad layout for photonic modulator 100. The example pad layout shows ground pads 140-1, 140-2, 140-3 all connected to chip and probe ground (GND), but not connected to modulator 100. P pad 142 is a signal pad for coupling to a first differential output signal (S) and N pad 144 is a signal pad for coupling to a second differential signal (S-bar). Signal S-bar is 180° out of phase with respect to signal S. Signals S and S-bar may be provided by differential drive circuitry 200 (FIG. 2A). P pad 142 may be connected to P-type contact region 116 (FIG. 1A). N pad 144 may be connected to N-type contact region 118 (FIG. 1A).

In operation, waveguide 104 may receive input optical signal 132 via evanescent coupling. Input optical signal 132 may be coupled into micro-resonator 102 of photonic modulator 100 and back out of micro-resonator 102 into waveguide 104. Waveguide 104 may transmit output optical signal 134 which is modulated via modulator sections 108-1, 108-2.

The transmission of light in waveguide 104 may be sensitive to the wavelength of input optical signal 132, and may be greatly reduced at wavelengths in which the circumference of micro-resonator 102 corresponds to an integer number of guided wavelengths (i.e., a resonance condition of micro-resonator 102). By tuning the effective (i.e., refractive) index of micro-resonator 102, the resonance wavelength of micro-resonator 102 may be modified, thus inducing a modulation of input optical signal 102. The modulation is equivalent to a shift between a resonance condition (where a maximum amount of optical energy accumulates in micro-resonator 102) and a non-resonance condition (where a reduced amount of optical energy may accumulate in micro-resonator 102).

Modulator sections 108-1, 108-2 may control the density of free charge carriers, which may alter the effective index of micro-resonator 102. As light in micro-resonator 102 passes through modulator sections 108-1, 108-2, carriers may be injected or removed (i.e., depleted) by altering the polarity of an applied voltage (via contacts 120 and 122), causing the light to be modulated.

As described above, modulator sections 108 represent electro-refraction modulators, where changes in the index of refraction of a material induced by an applied electric field may be used to modulate the proportion of light through the modulator. According to another embodiment, modulator sections 108 may include electro-absorption modulators. Electro-absorption modulators may produce modulation by modifying the light absorbing properties of a material with an electric field. For example, electro-absorption modulators may use the Franz-Keyldysh effect to shift the band structure of a semiconductor material via an electric field. The Franz-Keyldysh effect may be used with modulators which include semiconductor quantum wells as well as devices without quantum wells.

Although FIG. 1A illustrates a single waveguide 104, it is understood that photonic modulator 100 may be coupled to an input waveguide and an output waveguide which may be separate from the input waveguide. Although waveguide 104 is illustrated as being horizontally-coupled to photonic modulator 100, it is understood that waveguide 104 may be side-coupled to photonic modulator 100.

Referring next to FIG. 2A, a circuit diagram of photonic modulator 100 coupled to differential drive circuitry 200 is shown. FIG. 2A also illustrates electrical contacts 120, 122 of contact regions 116, 118 (FIG. 1A). Contacts 120, 122 may be electrically connected to differential drive circuitry 200 via probe 204. FIG. 2A also illustrates example resistance values ($R_{mod1}$, $R_{mod2}$) and capacitance value ($C_{mod}$) between contacts 120, 122, as well as between contacts 120, 122 and probe 204.

Drive circuitry 200 includes drivers 202-1, 202-2. Drivers 202-1 and 202-2 may be identical except for being 180° out of phase. Driver 202-1 may be electrically coupled to P-type contact region 116 (FIG. 1A) by contact 120 via probe 204. Driver 202-2 may be electrically coupled to N-type contact region 118 (FIG. 1A) by contact 122 via probe 204.

Each driver 202 includes AC signal source 206. Each driver 202 may also include bias-T network 208 for setting a DC bias point of driver 208. Each driver 202 may also include transmission line 210. AC signal sources 206-1 and 206-2 may produce AC signals having a same amplitude (for example, 500 my), which may be 180° out of phase with each other. Accordingly, AC signal source 206-1 may produce AC signal S, whereas AC signal source 206-2 may produce AC signal S-bar, where AC signal S-bar may be 180° out of phase with AC signal S.

According to an exemplary embodiment, in a differential driving scheme, the voltage on each transmission line 210-1, 210-2 may be cut in half using AC signals with matched phase (i.e., 180° out of phase), to generate two times the differential voltage swing on each transmission line 210-1, 210-2. Differential signaling may be readily integrated with different LVDS regimes (e.g., positive emitter-coupled logic (PECL), emitter-coupled logic (ECL), voltage mode logic (VML), current mode logic (CML), etc.). Differential signaling may enable the use of very low voltage drivers (typically half of the voltage normally used), such as CMOS inverters.

Referring to FIG. 2B, a circuit diagram of an example LVS schematic is shown. In FIG. 2B, photonic modulator 100 is coupled in parallel with resistor R. In an exemplary embodiment, resistor R is about 100Ω. Photonic modulator 100 may be coupled to current driver 220 via transmission line 222. Accordingly, it may be possible to perform differential signaling in on-chip implementations of LVS, which may be directly terminated into photonic modulator 100 (without additional modifications).

Referring next to FIG. 3, an overhead view diagram of photonic modulator 300 is shown, according to another exemplary embodiment of the present invention. Photonic modulator 300 is similar to photonic modulator 100 (FIG. 1A), except that photonic modulator 300 may include more than two modulator sections 302 (for example, four modulator sections 302-1, 302-2, 302-3 and 302-4) separated from each other and extending in respective arcs around a central axis (such as central axis 126 shown in FIG. 1B).

Micro-resonator 102 may include P-type contact regions 304-1, 304-2 and N-type contact regions 306-1, 306-2. P-type contact region 304-1 may be electrically coupled to modulator sections 302-1 and 302-2. P-type contact region 304-2 may be electrically coupled to modulator sections 302-3 and 302-4. N-type contact region 306-1 may be electrically coupled to modulator sections 302-2 and 302-3. N-type contact region 306-2 may be electrically coupled to modulator sections 302-1 and 302-4.

In an exemplary embodiment, each modulator section 302-1, 302-2, 302-3 and 302-4 may extend in an arc of just less than $\pi/4$ radians around central axis 126 (FIG. 1B) of micro-resonator 102. In other words, each modulator section 108 subtends about $\pi/4$ radians of a circumference of micro-resonator 102, with angular centers of modulator sections 302-1, 302-2, 302-3 and 302-4 being arranged about $\pi/4$ radians apart.

Figure 4:
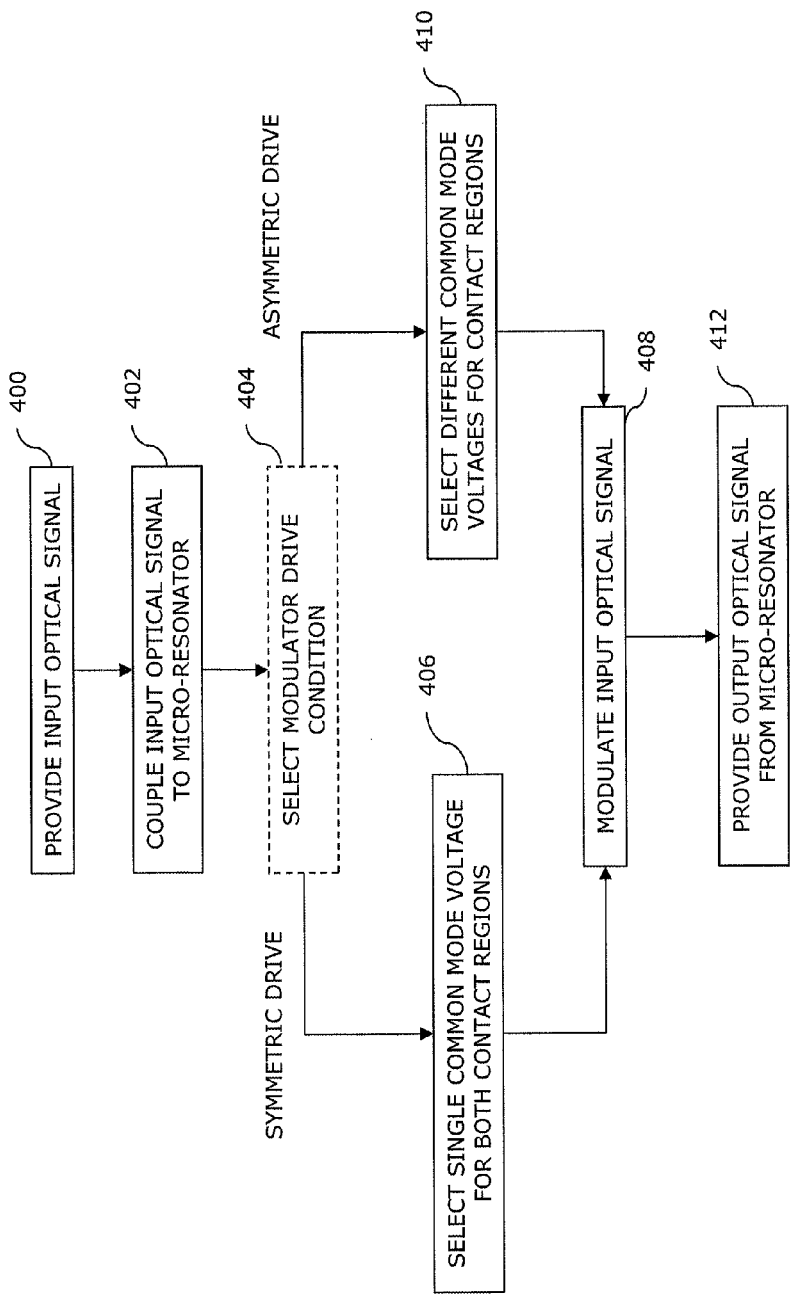
FIG. 4 is a flowchart diagram of an exemplary method for modulating an input optical signal, according to an embodiment of the present invention.

Referring next to FIG. 4, a flowchart diagram is shown of an exemplary method for modulating an input optical signal, according to an embodiment of the present invention. The steps illustrated in FIG. 4 represent an example embodiment of the present invention. It is understood that certain steps may be performed in an order different from what is shown. It is also understood that certain steps may be performed synchronous with each other.

At step 400, an input optical signal is provided to a waveguide, for example, input optical signal 132 (FIG. 1A) is provided to waveguide 104. At step 402, the input optical signal may be evanescently coupled to a micro-resonator, for example, micro-resonator 102 (FIG. 1A).

At optional step 404, a modulator drive condition may be selected, for example, a symmetric drive condition or an asymmetric drive condition may be selected for differential drive circuitry 200 (FIG. 2A).

If, at optional step 404, a symmetric drive condition is selected, step 404 may proceed to step 406. At step 406, a single common mode voltage may be selected for both contact regions. For example, differential drive circuitry 200 (FIG. 2A) may select a single common mode voltage offset to be applied between P-type contact region 116 (FIG. 1A) and N-type contact region 118. An example of a symmetric drive condition is described further below with respect to FIGS. 7A-8F. Step 406 proceeds to step 408.

If, at optional step 404, an asymmetric drive condition is selected, step 404 may proceed to step 410. At step 410, different common mode voltages may be selected for each contact region. For example, differential drive circuitry 200 (FIG. 2A) may select a first common mode voltage to be applied to P-type contact region 116 (FIG. 1A) and a second (i.e., different) common mode voltage to be applied to N-type contact region 118. Asymmetric differential signaling is described further below. Examples of asymmetric drive conditions are also described with respect to FIGS. 9A-12C. Step 410 proceeds to step 408.

At step 408, the input optical signal is modulated to form an output (modulated) optical signal, for example, by differential signaling provided by differential drive circuitry 200 (FIG. 2A) to modulation sections 108-1, 108-2 (FIG. 1A) of photonic modulator 100. Differential drive circuitry 200 (FIG. 2A) may operate under a symmetric drive condition (step 406) or an asymmetric drive condition (step 410). At step 412, the output optical signal is provided from the micro-resonator, for example, output optical signal 134 (FIG. 1A) may be coupled from micro-resonator 102 to waveguide 104.

In general, each modulator section 108 (FIG. 1B) may represent a PN junction diode. An idealization of the actual charge distribution in each depletion region 124 (FIG. 1B) may be represented by a depletion approximation (d) shown in equation 1 as:

$$d = \sqrt{\frac{2\varepsilon_s(V_{bi} - V_a)}{e}\left(\frac{N_a + N_d}{N_a N_d}\right)} \quad (1)$$

where $N_a$ represents the number of active P-type dopants; $N_d$ represents the number of active N-type dopants; $V_{bi}$ represents the built in voltage of the diode; $V_a$ represents the applied voltage to the diode; e represents the electronic charge and $\varepsilon_s$ represents the electronic permittivity of silicon. For further reference, $V_{to}$ represents the diode turn on voltage (i.e., the forward voltage at which the built in voltage is overcome and current increases exponentially) and $V_{bd}$ represents the diode breakdown voltage (i.e., the reverse bias voltage at which the diode current increases exponentially).

In addition, the diode (depletion) capacitance for each modulator section 108 (FIG. 1B) may be calculated from equation 2 as:

$$C = \frac{\varepsilon_s A}{d} \quad (2)$$

where A represents the area of the diode.

In general, asymmetric differential signaling of photonic modulator 100 (FIGS. 1A and 1B) utilizing a PN junction diode (i.e., P-type layer 112 and N-type layer 114) is a driving method in which both P-type contact region 116 and N-type contact region 118 may be AC coupled with different common modes.

Asymmetric differential signaling may be performed according to two different methods. In the first method, P-type contact region 116 (FIG. 1A) may have a common mode of 0 V and N-type contact region 118 may have a variable common mode. In the second method, P-type contact region 116 (FIG. 1A) may have a variable mode and N-type contact region 118 may have a common mode of 0 V.

In both methods, the center bias point on the diode (i.e., modulator sections 108 (FIG. 1A)) may be shifted. Because the center bias point may be adjusted, the diode may be optimized, by trimming the voltage signals to run the diode on the edge of $V_{to}$ without crossing $V_{to}$. This also allows the diode to be run at the edge of $V_{bd}$. In the case of running close to $V_{to}$, the depletion capacitance C (equation 2) has the largest effect, because it is a square root function of $(V_{bi}-V_a)$ (see equation 1). Thus, each incremental change in voltage may produce a large effect on the diode operating conditions. There may be several different applications of this method.

A first application includes driving the diode with a small voltage. By asymmetrically driving the diode with a positive center bias point, a smaller total voltage amplitude may be used. The diode may be driven completely in forward bias, but below $V_{to}$. This may take advantage of the steepest part of the slope in the depletion approximation of capacitance.

A second application includes driving the diode with a large voltage. By asymmetrically driving the diode with a negative center bias point, an amplitude sufficient to modulate resonators with low quality factor (Q) and high bandwidth may be obtained. This may allow for increased voltage, while still maximizing the large modulation effect of voltages approaching $V_{to}$.

A third application includes driving a diode with a maximum possible voltage. By asymmetrically driving the diode with a center bias point halfway between $V_{to}$ and $V_{bd}$, a maximum voltage swing of $V_{to}-V_{bd}$ may be obtained. This driving scheme may be useful for driving fast widely tunable wavelength-division multiplexing (WDM), coarse WDM (CWDM) or frequency-division multiplexing (FDM) filters. The spectral frequency range for switching may be about 100 GHz with a switching speed of about 10 Gbps. In addition, by maximizing the voltage swing, the length of MZM 500 (described further below in FIG. 5) may be decreased to a minimal voltage dependent value.

Figure 5:
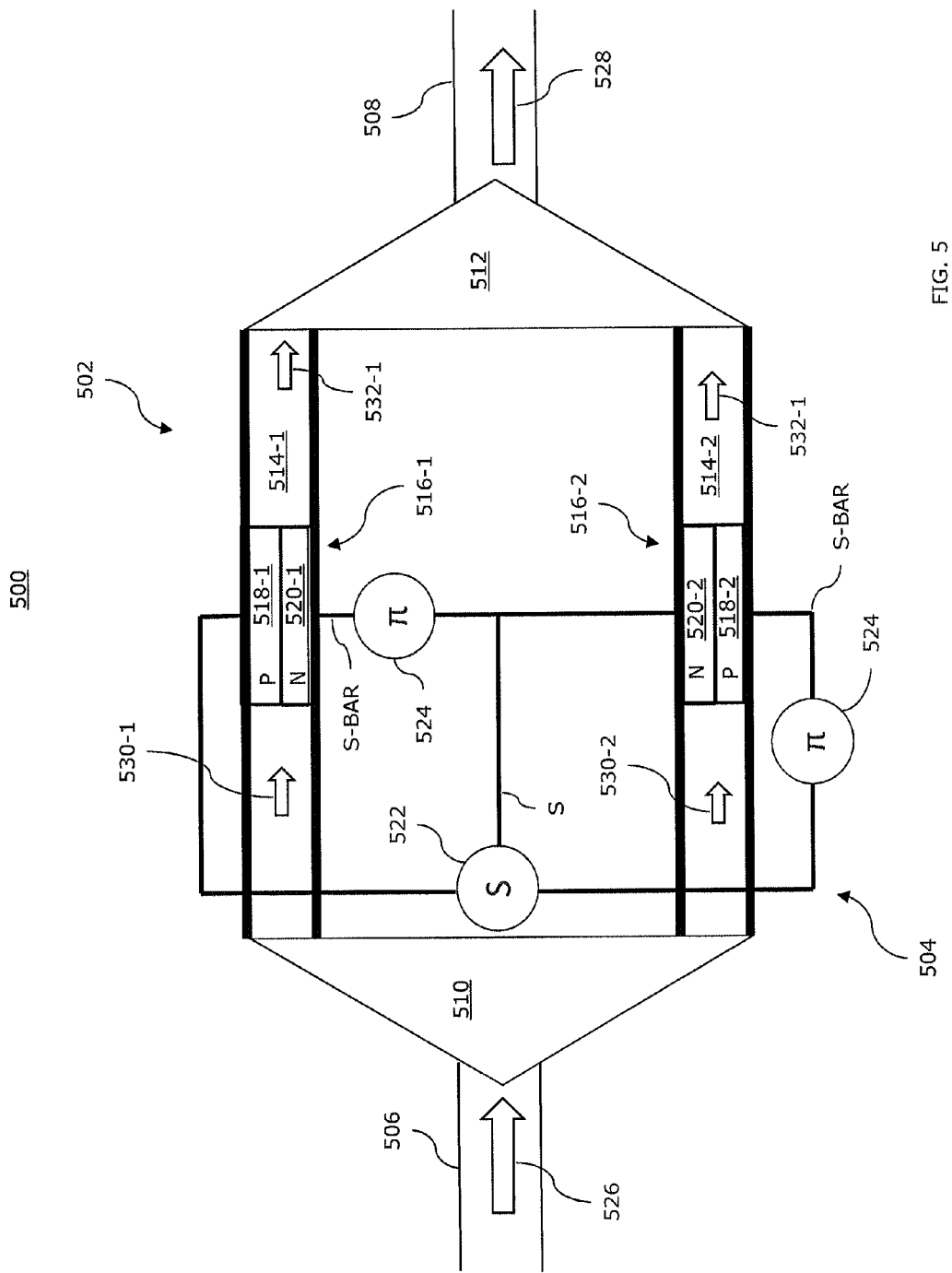
FIG. 5 is a functional block diagram of an exemplary Mach-Zehnder modulator (MZM) including associated differential drive circuitry, according to an embodiment of the present invention.

Referring next to FIG. 5, an exemplary differential Mach-Zehnder modulator (MZM) 500 is shown, according to an embodiment of the present invention. Differential MZM 500 (also referred to herein as MZM 500) may include Mach-Zehnder interferometer 502 and differential drive circuitry 504 electrically coupled to Mach-Zehnder interferometer 502.

Mach-Zehnder interferometer 502 may include input coupler 510, output coupler 512 and two waveguide arms 514-1, 514-2. Each waveguide arm 514-1, 514,2 may be optically coupled to input coupler 510 and output coupler 512. In an exemplary embodiment, waveguide arm 514-1 has an intrinsic phase shift of π/2 and waveguide arm 514-2 has zero intrinsic phase shift. According to another embodiment, each waveguide arm 514 may have zero intrinsic phase shift.

Each of waveguide arms 514,1, 514-2 may include respective modulator sections 516-1, 516-2. Each modulator section 516 may include P-type layer 518 and N-type layer 520 forming a PN junction therebetween. FIG. 5 illustrates P-type layer 518 and N-type layer 520 arranged to form a vertical PN junction. Although not shown, P-type layer 518 and N-type layer 520 may also be arranged to form a lateral PN junction.

Input coupler 510 may be optically coupled to input waveguide 506 and output coupler 512 may be optically coupled to output waveguide 508. Input coupler 510 may include a splitter to split input optical signal 526 (from input waveguide 506) into two substantially equal portions 530-1, 530-2 which may be provided to respective waveguide arms 514-1, 514-2. Output coupler may be configured to mix modulated optical signals 532-1, 532-2 (from respective modulation sections 516-1, 516-2) into output optical signal 528. Input coupler 510 and output coupler 512 may include any suitable coupler for respectively splitting input optical signal 526 and mixing modulated optical signals 532-1, 532-1.

Each waveguide arm 514 may be formed of any suitable CMOS compatible semiconductor material including the materials described above with respect to micro-resonator 102 (FIG. 1A). P-type layer 518 and N-type layer 520 may have opposite doping concentrations of any suitable concentration. According to an exemplary embodiment, P-type layer 518 and N-type layer 520 may each have a doping concentration of about $10^{18}$ cm$^{-3}$. Although not shown Mach-Zehnder interferometer 502, input waveguide 506 and output waveguide 508 may be formed on a substrate. Examples of suitable materials for the substrate are described above with respect to photonic modulator 100 (FIG. 1A).

Differential drive circuitry 504 includes signal source 522 for producing electrical signal S and phase delay 524 for producing electrical signal S-BAR. Phase delay 524 delays electrical signal S by π radians. Electrical signal S is electrically coupled to P-type layer 518-1 (of modulator section 516-1) and is also electrically coupled to N-type layer 520-2 (of modulator section 516-2). Electrical signal S-BAR is electrically coupled to N-type layer 520-1 (of modulator section 516-1) and is also electrically coupled to P-type layer 518-2 (of modulator section 516-2). Thus, the electrical signal on one line on each of waveguide arms 514-1, 514-2 may be delayed by π radians. Accordingly, differential drive circuitry 504 is coupled to each of modulation sections 516-1, 516-2 (of both waveguide arms 514-1, 514-2).

In operation, waveguide 504 may receive input optical signal 526 via input waveguide 506. Input optical signal 132 may be coupled into waveguide arms 514-1, 514-2 of Mach-Zehnder interferometer 502 by input coupler 510, forming respective optical signals 530-1, 530-2. Optical signals 530-1, 530-2 may be modulated via modulation sections 516-1, 516-2 and differential drive circuitry 504 to form modulated signals 532-1, 532-2. Output coupler 512 may mix modulated signals 532-1, 532-2 to form output optical signal 528, which may be transmitted via output waveguide 508.

The differential signaling (by differential drive circuitry 504) to each waveguide arm 516 of Mach-Zehnder interferometer 502 may provide a desired phase shift to modulate input optical signal 526. Similar to photonic modulator 100 (FIG. 1A), application of a voltage to each modulator section 516 causes the effective index of each waveguide arm 514 to change. The change in the effective index of each waveguide arm 514 may change the speed of propagation of optical signal 530 along each waveguide arm 514. Changing the voltage on each waveguide arm 514 determines whether the two optical signals 530 interfere constructively or destructively at output coupler 512, thereby controlling the intensity (and modulation) of output optical signal 528. Because differential signaling is applied to both waveguide arms 514-1, 514-2, the applied voltage for MZM 500 may be cut in half compared to conventional differential MZMs and may be about a quarter of the applied voltage used for non-differential MZMs.

Similar to photonic modulator 100 (FIG. 1A), MZM 500 may use symmetric drive conditions or asymmetric drive conditions, as described above with respect to FIG. 4. According to an exemplary embodiment, a single arm of MZM 500 (for example, waveguide arm 514-1) may use differential drive circuitry 504 as a phase shifter.

The invention will next be illustrated by reference to an example. The example is included to more clearly demonstrate the overall nature of the invention. The example is exemplary, not restrictive of the invention.

Example

An example photonic modulator 100 having differential drive circuitry 200 as shown in FIG. 2A is next described under various operating conditions. In the example, photonic modulator 100 has the dimensions described above with respect to FIGS. 1A-1D. Reference is made to FIGS. 1A and 2A for the example described below.

Photonic modulator 100 is driven using two signals that are π radians out of phase as shown in FIG. 2A. The signals can be referred to as S and S-bar. S refers to the 0 phase signal being driven (by signal source 206-1) and is connected to the anode (P-type contact region 116). S-bar refers to the inversion of that signal, or the signal S being driven π radians out of phase (by signal source 206-2), and it is connected to the cathode (N-type contact region 118). In a differential driving scheme the voltage on each line may be cut in half using S and S-bar signals with matched phase creating two times the differential swing on each line in the pair.

Photonic modulator 100 is probed using a ground-signal-ground-signal-ground (GSGSG) dual signal probe 204 that has 50Ω termination on each active line to ground. (See FIG. 1D.) Probe 204 contacts aluminum pads 120, 122 with 30 fF of capacitance to ground. Minimum distance (about 100 μm) aluminum interconnects are used to connect the pads to the optical modulator diode (i.e., modulator sections 108), which may be represented as 1600Ω of resistance in line with 15 fF. The capacitance is measured with an HP 4284A LCR meter using a de-embedding circuit and agrees with simulated and analyzed values.

No additional aluminum interconnect is used for this device. Each signal pad has a capacitance to ground, with half the voltage of a single ended device, and in an implementation could be flip-chip-mounted using very low capacitance pads. The additional ground lines that are present may ease probing, but do not add to the capacitance present in the interconnect; they are not contacted to the device. The additional ground lines run to the chip ground and their presence is not necessary in implementation on CMOS. This inherent strength of differential signaling means that the microprocessor ground may be different from a stacked photonic chip ground and that ground bounce impact may minimized.

For both symmetric and asymmetric drive conditions, light from an Agilent 8164B lightwave measurement system was coupled into photonic modulator 100 using lensed fibers. Referring to FIG. 2A, the electrical drive from the differential outputs of a Centellax TG1B1-A bit error rate tester (BERT), through bias-T network 208 is provided on each line and this signal was driven into photonic modulator 100 using Cascade Microtech 50Ω terminated Infinity GSGSG probes 204. The optical output from the laser is 6 dBm with about 10 dB coupling loss both onto and off of the silicon die, resulting in a signal level of about −15 dBm at the output of the chip when the laser source is off resonance.

The devices were measured with an insertion loss of about 3 dB. Optical power is about −18 dB emanating from the output waveguide off chip in the '1' state. During modulation this is reduced to about −21.1 dBm when the extinction ratio measured on the scope is about 5 dB and this output power scales by approximately ½ dB with about 1 dB changes in extinction ratio.

Referring to FIG. 6, an example graph of resonances at DC bias as a function of wavelength detuning is shown for various applied voltages for photonic modulator 100. The applied voltages include 750 mV reverse bias (RB), 500 mV RB, 150 mV RB, 150 mV forward bias (FB), 500 mV FB and 750 mV FB. The DC resonances of photonic modulator 100 show a Q of about $10^4$. FIG. 6 shows that these values of optical power are to be expected with the insertion loss of 3 dB. The modulated output optical signal is amplified back to 0 dBm using an Amonics Erbium Doped Fiber Amplifier (EDFA) for eye analysis in a Tektronix DSA8200 digital sampling oscilloscope.

Bit error rate (BER) testing is done after conversion back to the electrical domain in an external Nortel PP-10G 11 Gbps detector. The Tektronix oscilloscope has an internal detector. The eye diagrams and bit error rate measurements are unfiltered in the electrical and optical domain. The eye diagrams are open and all data is recorded using a $2^{31}-1$ pseudorandom bit sequence (PRBS) yielding a bit error rate of less than about $10^{-12}$ in every case. The PRBS test is typically associated with 10 Gbps protocols such as Synchronous Optical Networking (SONET) OC-192.

Referring next to FIGS. 7A-7B and FIGS. 8A-8F, example results of driving photonic modulator 100 with various symmetric drive conditions are shown. FIG. 7A is an example graph of input differential signals relative to a common mode voltage; FIG. 7B is an example graph of an output differential signal with respect to bias point; and FIGS. 8A-8F are example eye diagrams for photonic modulator 100 for various symmetric drive conditions.

FIG. 7A shows DC symmetric electrical coupling of the device using an arbitrary common mode voltage for both signal 702 (signal S driven by signal source 206-1) and signal 704 (signal S-bar driven by signal source 206-2). As shown in FIG. 7A, signal 704 is π radians out of phase with signal 702. The common mode of the drive (dotted line) is varied from 250 mV to 800 mV to 1.2V, always resulting in the same differential signal on photonic modulator 100, as shown in FIG. 7B. Whatever common voltage is chosen, photonic modulator 100 consistently sees a voltage across the contacts of 500 mV, either in forward bias (one state—logic 1) or reverse bias (the other state—logic 0), corresponding to a voltage change of 1 V across photonic modulator 100.

FIGS. 8A-8C represent eye diagrams for respective common modes of 0 mV, 1.25 V and 1.5 V at an applied voltage of 500 mV. FIGS. 8D-8F represent eye diagrams for respective common modes of 0, 1.25 V and 1.5 V at an applied voltage of 400 mV. FIGS. 8A-8C show the same extinction of about 5 dB, thus verifying the flexibility of the device to DC couple at arbitrary voltage levels. FIGS. 8D-8F show an extinction of about 4 dB. The voltage levels and amplitudes in FIGS. 8D-8F show compatibility with both CML and VML signaling.

The eye diagrams in FIGS. 8A-8C are for input common modes of 0V, 1.25V and 1.5V which is consistent with AC coupling, VML and CML, respectively (although the latter two use larger amplitudes in industrial applications). The different common modes are obtained by using bias-T network 208 to shift each line equally. The nearly indistinguishable eye diagrams verify that photonic device 100 is capable of receiving differential signals with a multitude of common modes, rendering the same results and affording compatibility with different standards or simply taking complementary signals from two inverters.

In the 500 mV amplitude symmetric tests (FIGS. 8A-8C), 5 dB extinction is obtained when measured from the middle of the top rail to the middle of the bottom rail. Differential signaling may allow optical modulation with reduced voltage on signal lines. Differential signaling may therefore function with low $V_{dd}$ values as predicted by ITRS, but may not increase the extinction ratio for a given voltage applied to the device.

To obtain compatibility with LVDS, the performance with a 400 mV swing on each line (for a total of 800 mV) into photonic modulator 100 is shown in FIGS. 8D-8F. FIGS. 8D-8F illustrate that the extinction degrades with lower voltage. However, about 4 dB extinction is still achievable when measured from rail to rail. The bandwidth limitation of photonic modulator 100 may introduce a power penalty of about 2 dB in the 500 mV case and about 2.5 dB in the 400 mV case.

Even though the measurements are performed with bias-T network 208 (that is each side being AC coupled), the differential driving method described herein may allow for DC-coupled operation with simple standard differential drivers of a variety of designs (LVDS, LV-CMOS, VML, CML). Additional testing at common mode voltages below 1 V, compatible with current and future $V_{dd}$ levels, also yielded eye diagrams that were indistinguishable from those seen in the FIGS. 8A-8F.

Referring next to FIGS. 9A-12C, a driving scheme and resulting eye diagrams are shown for drive amplitudes of about 750 mV down to about 150 mV using an asymmetric drive for photonic modulator 100. In particular FIGS. 9A, 10A, 11A and 12A are example graphs of input differential signals illustrating respectively different asymmetric common mode voltages; FIGS. 9B, 10B, 11B and 12B are example graphs of output differential signals with respect to the corresponding bias point; and FIGS. 9C, 10C, 11C and 12C are example eye diagrams for the various asymmetric drive conditions.

In FIG. 9A, a 750 mV drive amplitude is provided on both the P (signal 902) and N (signal 904) silicon contacts on photonic modulator 100. The resulting 1.5 V amplitude signal is shown in FIG. 9B to be slightly reversed biased because of the 300 mV negative bias driven into the N silicon (signal 904 shown FIG. 9A) through the use of bias-T network 208. The corresponding 10 Gbps eye diagram in FIG. 9C shows about 6 dB extinction.

In FIG. 10A, a 500 mV drive amplitude is provided on both the P (signal 1002) and N (signal 1004) silicon contacts on photonic modulator 100. The resulting 1 V amplitude signal is shown in FIG. 10B to be slightly forward biased because of the 300 mV positive bias driven into the N silicon (signal 1004) through the use of bias-T network 208. The slight forward bias shown in FIG. 10B may be beneficial because the depletion region expands according to the square root of the voltage applied (see equation 1). The corresponding 10 Gbps eye diagram in FIG. 10C shows about 5 dB extinction.

In FIG. 11A, a 300 mV drive amplitude is provided on both the P (signal 1102) and N (signal 1104) silicon contacts on photonic modulator 100. The resulting 600 mV amplitude signal is shown in FIG. 11B to be only forward biased because of the 400 mV bias driven into the N silicon (signal 1104) through the use of bias-T network 208. The corresponding 10 Gbps eye diagram in FIG. 11C shows about 4 dB extinction.

In FIG. 12A, a 150 mV drive amplitude is provided on both the P (signal 1202) and N (signal 1204) silicon contacts on photonic modulator 100. The resulting 300 mV amplitude signal is shown in FIG. 12B to be only forward biased because of the 500 mV bias driven into the N silicon (signal 1204) through the use of bias-T network 208. The corresponding 10 Gbps eye diagram in FIG. 12C shows about 3 dB extinction.

This approach described in FIGS. 9A-12C may not be readily transferable to commonly used differential signaling standards, nor may it lend itself to simple circuit implementation. However, it was determined that photonic modulators 100 could be driven with signals as low as 150 mV using this technique (although with 500 mV signals the performance is comparable to the symmetric case). According to an exemplary embodiment, photonic modulator 100 may be driven more into forward bias than reverse bias, with small enough amplitude so as not to go beyond diode turn on, while maintaining a small built in field across the depletion region. The built in field may allow carriers to be swept out without recombination, which occurs in further forward bias and which may limit the electrical bandwidth. In this way, small voltages may take advantage of the square root function of depletion width (equation 1) which changes most efficiently just below diode turn on.

In FIGS. 9A-12C, differential signaling is used, as in the symmetric case, but the lines have asymmetric common modes. The resulting device bias is the voltage on the anode (for example, signal 902) minus the voltage on the cathode (for example, signal 904). So for FIGS. 9A and 9B, two differential 750 mV signals may still result in a 1.5 V differential signal on the device although the actual voltage levels are shifted as shown in FIG. 9B. By applying positive voltage to the cathode (signal 904) and a mix of positive and negative signals on the anode (signal 902), the device is pushed into partial reverse bias as shown in FIG. 9B.

This method of biasing the cathode is used in each of FIGS. 9A, 10A, 11A and 12A. As the voltage amplitude drops below 300 mV (FIG. 12A), it is possible to drive the modulator only in forward bias, yet below the diode turn on voltage (FIG. 12B). Note that although the 300 mV signal (FIG. 11A) can achieve a 4 dB extinction (FIG. 11C) as with the 400 mV symmetric case (FIGS. 8D-8F), it is noisier. The noise may be due to more free carriers being present in the sub-threshold forward bias domain.

In the asymmetric case (FIGS. 9A-12C), there may also be a bandwidth limitation in addition to the introduction of the aforementioned noise. From these two factors the associated penalty may be calculated to be about 2.9 dB in the 750 mV case (FIGS. 9A-9C), about 2.4 dB in the 500 mV case (FIGS. 10A-10C), about 3 dB in the 300 mV case (FIGS. 11A-11C) and about 6.3 dB in the 150 mV case (FIGS. 12A-12C).

FIGS. 9A-12C show the performance that is available if free level shifting of drivers may be obtained. For example, to obtain the results in FIGS. 9A-9C, a bias of about −200 mV may be generated on the output drive of the transmitter chip. This may be desirable, however as it uses drivers without a common mode voltage. The enhanced noise in forward bias may be reduced with mask filtering or band-pass filtering.

The energy-per-bit is calculated using the full amplitude of the voltage on device. The energy-per-bit is measured using time domain reflectometry (TDR) in ½ volt increments. Additionally an analytical estimation of capacitance is obtained using the depletion approximation, which is supported by integrating the simulated charge movement in DAVINCI software from Synopsys. In particular, energy results are based on integrating the voltage over time in the case of TDR measurement, calculating the energy from $E=CV^2$ in the analysis, and integrating the charge over time in the simulations.

In each case, the energy-per-bit is equal to the measured energy divided by 4, because the probability of switching from 0 to 1 is only ¼ of the total switching space (i.e., 00 01 10 11) in a Non-Return-to-Zero (NRZ), Pseudo-Random Bit Stream (PRBS). The energy per bit values in the symmetric case is about 3 fJ/bit for a 1 V swing (500 mV drive amplitude) and about 3 fJ/bit for a 800 mV swing (400 mV drive amplitude signal). These energies are for photonic modulator 100 itself plus a tungsten (W) plug set as interconnect caps are subtracted using de-embedding circuits. The energy does not include the amount that would be used for tuning in a thermally varying environment or the laser power. TDR is executed by integrating the reflection of a finite pulse so there may be additional energy consumed in strings of 1's longer than 2.5 bit slots and that is not captured, but this is no more than 1% of the amount given here.

In the case of the asymmetric drive, the energies are approximately the same for the 500 mV drive amplitude. For the other cases there is about 8.8 fJ/bit for a 1.5 V swing (750 mV drive signal), about 1.2 fJ/bit for a 600 mV swing (300 mV drive signal) and about 900 aJ/bit (0.9 fJ/bit) for a 300 mV swing (150 mV drive signal). The TDR measurements are executed in 500 mV increments. Therefore the 800 mV, 600 mV and 300 mV results are scaled for the voltage.

Advantages of exemplary low-voltage differentially-signaled photonic modulators of the present invention may include ease of implementation, elimination of special drivers and the expansion of the design space enabling simple implementations such as differential inverter sets. Additionally, asymmetric coupling of the exemplary photonic modulators is shown to be a potential path to lower modulation voltages. Symmetrically driven, an exemplary photonic modulator may use as low as about 2 fJ/bit with differential drive signal amplitudes of 400 mV. Asymmetrically driven, about 900 aJ/bit may be obtained with 150 mV of drive signal amplitude. In both cases, exemplary photonic modulators may operate at 10 Gbps with BER less than about $10^{-12}$ for $2^{31}-1$ PRBS patterns.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A photonic modulator comprising:
at least one modulator section including a P-type layer and an N-type layer forming a PN junction in the modulator section; and
differential drive circuitry electrically coupled to the P-type layer and the N-type layer of the at least one modulator section and configured to drive the P-type layer out of phase with the N-type layer of the at least one modulator section.

2. The photonic modulator of claim 1, wherein the at least one modulator section includes an electro-refraction modulator.

3. The photonic modulator of claim 1, wherein the at least one modulator section includes an electro-absorption modulator.

4. The photonic modulator of claim 1, wherein the differential drive circuitry is configured to drive the P-type layer and the N-type layer with a single common mode voltage.

5. The photonic modulator of claim 1, wherein the differential drive circuitry is configured to drive the P-type layer and the N-type layer with different common mode voltages.

6. The photonic modulator of claim 5, wherein a bias point of the at least one modulator section is adjustable using a drive voltage amplitude provided to the P-type layer and the N-type layer via the differential drive circuitry.

7. The photonic modulator of claim 6, wherein the bias point of the at least one modulator section is shifted from a reverse bias operation toward a forward bias operation by decreasing the drive voltage amplitude.

8. The photonic modulator of claim 1, the photonic modulator further including:

a micro-resonator, the at least one modulator section being formed in the micro-resonator;
a P-type contact region electrically coupled to the P-type layer of each modulator section; and
an N-type contact region electrically coupled to the N-type layer of each modulator section,
wherein the differential drive circuitry is electrically coupled to the P-type contact region and the N-type contact region of the micro-resonator.

9. The photonic modulator of claim 8, wherein the micro-resonator includes a disk micro-resonator.

10. The photonic modulator of claim 8, wherein the micro-resonator is formed of at least one of silicon, silicon nitride, indium phosphide, germanium, silica, fused quartz, sapphire, alumina, glass, gallium arsenide, gallium aluminum arsenide, selenium, silicon carbide, lithium niobate, silicon on insulator, germanium on insulator or silicon germanium.

11. The photonic modulator of claim 8, wherein:
the at least one modulator section includes two modulator sections, and
each of the modulator sections subtends about $\pi/2$ radians of a circumference of the micro-resonator.

12. The photonic modulator of claim 11, wherein angular centers of the two modulator sections are arranged in the micro-resonator about $\pi$ radians apart.

13. The photonic modulator of claim 8, wherein:
the at least one modulator section includes four modulator sections, and
each of the modulator sections subtends about $\pi/4$ radians of a circumference of the micro-resonator.

14. The photonic modulator of claim 13, wherein angular centers of the four modulator sections are arranged in the micro-resonator about $\pi/2$ radians apart.

15. The photonic modulator of claim 14, wherein:
the P-type contact region includes first and second P-type contact regions,
the N-type contact region includes first and second N-type contact regions,
the first P-type contact region and the first N-type contact region are respectively electrically coupled to the P-type layer and the N-type layer of two of the modulator sections, and
the second P-type contact region and the second N-type contact region are respectively electrically coupled to the P-type layer and the N-type layer of the remaining modulator sections.

16. A differential Mach-Zehnder modulator (MZM), comprising:
a Mach-Zehnder interferometer including:
an input optical coupler,
two waveguide arms optically coupled to the input optical coupler, each waveguide arm including a modulator section, each modulator section including a P-type layer and an N-type layer forming a PN junction in the modulator section, and
an output optical coupler optically coupled to the two waveguide arms; and
differential drive circuitry electrically coupled to the modulator section of each of the two waveguide arms of the Mach-Zehnder interferometer, the differential drive circuitry configured to differentially drive the P-type layer and the N-type layer of each modulator section out of phase with each other and to differentially drive the two waveguide arms.

17. The MZM of claim 16, wherein the differential drive circuitry includes:
a signal source for generating an electrical signal, and
a phase delay circuit configured to delay the electrical signal by $\pi$ radians, the electrical signal and the delayed electrical signal being provided to both waveguide arms of the Mach-Zehnder interferometer.

18. The MZM of claim 16, wherein the differential drive circuitry is configured to drive the P-type layer and the N-type layer of each modulator section with a single common mode voltage.

19. A method of modulating an input optical signal, the method comprising:
coupling the input optical signal to at least one modulator section, the at least one modulator section including a P-type layer and an N-type layer forming a PN junction in the modulator section;
applying differential signaling to the at least one modulator section via differential drive circuitry electrically coupled to the P-type layer and the N-type layer of the at least one modulator section so as to drive the P-type and N-type layers out of phase with each other, to modulate the input optical signal by the at least one modulator section and to form an output optical signal; and
transmitting the output optical signal.

\* \* \* \* \*